US012748307B2

(12) United States Patent
Zhong et al.

(10) Patent No.: US 12,748,307 B2
(45) Date of Patent: Sep. 29, 2026

(54) HOLOGRAPHIC PROJECTION DEVICE

(71) Applicant: Carl Zeiss Jena GmbH, Jena (DE)

(72) Inventors: Yi Zhong, Jena (DE); Siemen Kuehl, Jena (DE); Marc Junghans, Jena (DE); Roman Kleindienst, Jena (DE); Christoph Erler, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 338 days.

(21) Appl. No.: 18/284,809

(22) PCT Filed: Mar. 29, 2022

(86) PCT No.: PCT/EP2022/058199
§ 371 (c)(1),
(2) Date: Sep. 28, 2023

(87) PCT Pub. No.: WO2022/207597
PCT Pub. Date: Oct. 6, 2022

(65) Prior Publication Data

US 2024/0210691 A1 Jun. 27, 2024

(30) Foreign Application Priority Data

Apr. 1, 2021 (DE) ......................... 102021108354.0

(51) Int. Cl.
*G02B 27/01* (2006.01)
*G03H 1/02* (2006.01)

(52) U.S. Cl.
CPC ....... *G02B 27/0103* (2013.01); *G03H 1/0248* (2013.01)

(58) Field of Classification Search
None
See application file for complete search history.

(56) References Cited

U.S. PATENT DOCUMENTS 4,790,613 A * 12/1988 Moss ........................ G03H 1/22 340/461
6,473,209 B1 * 10/2002 Popovich ............... G02B 30/24 349/1

(Continued)

FOREIGN PATENT DOCUMENTS

DE 102017213114 A1 1/2019
JP 2013127489 A 6/2013

(Continued)

OTHER PUBLICATIONS

International Preliminary Report on Patentability rendered by the International Bureau of WIPO for PCT/EP2022/058199, dated Oct. 3, 2023, 6 pages.

(Continued)

*Primary Examiner* — Jyotsna V Dabbi
(74) *Attorney, Agent, or Firm* — Skaar Ulbrich Macari, P.A.

(57) ABSTRACT

A holographic projection device includes a first volume hologram that deflects light from a useful light source to generate an image. Light which does not originate from the useful light source and strikes the first volume hologram at a predetermined solid angle deflects such that it is perceptible as unwanted interfering light. The projection device also includes a holographic filter which deflects the light which does not originate from the useful light source and would strike the first volume hologram at the predetermined solid angle, before the light strikes the first volume hologram, such that it is not perceptible as unwanted interfering light, and/or deflects the light which does not originate from the useful light source and strikes the first volume hologram at the predetermined solid angle, after the deflection by the first volume hologram, such that it is not perceptible as unwanted interfering light.

20 Claims, 7 Drawing Sheets

(56) References Cited

U.S. PATENT DOCUMENTS

| | | | | |
|---|---|---|---|---|
| 11,815,681 | B2 * | 11/2023 | Dimov | G02B 5/32 |
| 2002/0027678 | A1 | 3/2002 | Halldorsson et al. | |
| 2018/0067321 | A1 | 3/2018 | Alexander et al. | |
| 2020/0189363 | A1 | 6/2020 | Jung | |
| 2022/0004006 | A1 | 1/2022 | Pfeiffer et al. | |

FOREIGN PATENT DOCUMENTS

| | | | | |
|---|---|---|---|---|
| WO | WO-2011121949 | A1 * | 10/2011 | B60K 35/60 |
| WO | 2020205101 | A1 | 10/2020 | |

OTHER PUBLICATIONS

International Search Report rendered by the International Bureau of WIPO for PCT/EP2022/058199, dated Aug. 10, 2022, 2 pages.

* cited by examiner

HOLOGRAPHIC PROJECTION DEVICE

PRIORITY

This application claims the priority of German patent application DE 10 2021 108 354.0 filed Apr. 1, 2021, which is hereby incorporated herein by reference in its entirety.

FIELD

The present invention relates to a holographic projection device for generating an image.

BACKGROUND

Such holographic projection devices are increasingly used, for example, in the automotive sector in order to be able to provide for the driver a head-up display in which the image is guided and/or deflected via the windshield. A volume hologram which can be embedded in or on the windshield can be used here for the deflection.

In such a holographic projection device, for example, sunlight (or a specific wavelength range thereof), which is incident on the windshield at a specific angle can be deflected in an undesirable manner by the volume hologram so that it is perceived as interfering light by the viewer.

SUMMARY

An object of the invention to provide a holographic projection device with which the disadvantage described can be overcome as completely as possible.

By providing the holographic filter, the light that does not originate from the used light source and is incident on the first volume hologram at the predetermined solid angle and would be deflected thereby so that it is unwanted interfering light can be diverted by deflection by means of the holographic filter such that it is no longer perceptible by the viewer, for example. This prevents the unwanted interfering light. Furthermore, light that originates from the used light source and would be incident on the first volume hologram at the predetermined solid angle, can also be deflected by means of the holographic filter before being incident on the first volume hologram in such a way that it is not perceptible as unwanted interfering light.

The holographic projection device may be designed such that it deflects an image supplied to it by means of the first volume hologram such that an observer can perceive it when they position their eye in a predetermined viewing region and look at the projection surface at a predetermined viewing angle. In this case, the first volume hologram can thus act for example as an optical component (such as lens, mirror and/or grating).

Furthermore, the holographic projection device may have a reconstruction setup. In particular, this is understood to mean that the first volume hologram is designed in such a way that an (at least one) image is exposed therein. If this hologram is then illuminated by light in a predetermined manner, a reconstruction of the recorded image takes place in a known manner so that an observer can perceive it. Thus, the image to be generated (in particular as a three-dimensional image) which is reconstructed by light from a used light source (for example, a laser or an LED). can be exposed in the first volume hologram. Thus, the first volume hologram can be designed such that a (e.g. three-dimensional) image or a dynamic image sequence (depending on the viewing angle) is exposed therein. The first volume hologram may be formed in or on a transparent carrier. In this case, the light from the used light source can also be coupled into the carrier via a coupling point spaced apart from the first volume hologram and be guided in the carrier (directly or, for example, by internal total reflections or other reflections) to the first volume hologram, such that the desired reconstruction of the recorded image is then produced.

The first volume hologram of the projection device may also be designed as a lens.

Furthermore, the holographic projection device can produce the image as a real image (e.g. outside the plane of the first volume hologram or in this plane) or as a virtual image (e.g. outside the plane of the first volume hologram).

For example, the interfering light to be avoided may be interfering light that a viewer of the generated image can perceive, although this is to be avoided. Alternatively or in addition, it is also possible for one or more solid angle regions to be defined with reference to the holographic projection device and in particular with reference to the first volume hologram and/or the holographic filter in which interfering light is to be avoided. When using the holographic projection device in the automotive sector, this may be, for example, a region that would disturb pedestrians or other road users.

The first volume hologram of the holographic projection device is designed in particular such that the intended deflection is designed for one or more predetermined wavelength ranges (preferably with a bandwidth of +/−50 nm, +/−40 nm, +/−30 nm, +/−20 nm, +/−10 nm, +/−5 nm). The light that does not originate from the used light source and is or would be incident on the first volume hologram at the predetermined solid angle range, whereby unwanted interfering light may occur, preferably has a wavelength range which does not correspond to the wavelength ranges for which the first volume hologram is designed.

For example, the first volume hologram may be designed for a wavelength of 500 nm+/−10 nm for an angle of incidence of 30° in order to cause the desired deflection for generating the image. In this case, for example, a high effectiveness of the first volume hologram for, for example, 640 nm for angles of incidence of −5° and −67° may be present, which is undesirable.

Therefore, in this case, the holographic filter can be designed or configured such that it deflects the interfering light of 640 nm+/−10 nm and the angle of incidence of −5° and −67° in such a way that the interfering light is avoided.

The holographic filter may itself be formed as a second volume hologram and in particular as a transmissive volume hologram. Of course, it is also possible that it is designed as a reflective volume hologram.

The first volume hologram and the holographic filter may be provided on or in a transparent body. The transparent body may, for example, be a window of a vehicle (in particular the windshield) or another transparent body. It can be designed as a plane-parallel plate. It is also possible that the transparent body comprises at least one curved boundary surface. For example, the transparent body can be designed as a spectacle lens.

The vehicle may be a land vehicle, a watercraft or an aircraft. In addition, the vehicle may be a motorized vehicle or a muscle-powered vehicle. In particular, the vehicle may be a passenger car or a truck.

The vehicle window may comprise an inner side facing the vehicle interior, wherein the first volume hologram and the holographic filter are formed on the inner side.

Furthermore, the vehicle window may comprise an outer side facing away from the inner side, wherein the holographic filter is designed for light that does not originate from the used light source and enters the vehicle window via the outer side. This means that interferences from ambient light, which in vehicles normally enters the vehicle from the outside to the inside, can be easily avoided or reduced.

The first volume hologram and the holographic filter can be arranged one above the other. In particular, they can be in the form of a layer stack. It is also possible that they are congruent. Further, the first volume hologram and the holographic filter may be arranged directly one on top of the other or with an interposed connecting layer.

The deflection of the holographic filter can be effected such that the deflected light in the transparent body is guided through at least one reflection. The at least one reflection can be a total internal reflection. Furthermore, the transparent body may comprise a beam trap for the light to which it passes through the guidance in the transparent body. The deflection of the holographic filter can also be effected in such a way that the deflected light propagates directly to the beam trap without any reflection in the transparent body.

Furthermore, the transparent body may comprise a coupling point which is spaced apart from the first volume hologram. For example, the image to be projected can be coupled into the transparent body via the coupling point and be guided therein (for example without reflection or by way of at least one reflection, such as a total internal reflection) to the first volume hologram.

The projection device can be designed such that the holographic filter deflects the light that does not originate from the used light source and is or would be incident on the first volume hologram at the predetermined solid angle, depending on the polarization. Preferably, the larger of the polarization components can be deflected. The larger polarization component of the light that does not originate from the used light source and is or would be incident on the first volume hologram at the predetermined solid angle can be determined by, or result from, for example, coupling the light into the transparent body. In the case of sunlight entering a transparent body, this may be particularly the s-polarization component, meaning that this s-polarization component is deflected by the holographic filter. This achieves effective filtering.

The deflection by means of the first volume hologram can be effected in a first plane, and the deflection by means of the holographic filter can be effected in a second plane, which is neither parallel to nor coincides with the first plane. In particular, the first and second planes can be perpendicular to each other. However, it is also possible that the two planes are parallel to each other.

The holographic filter may be arranged in front of or behind the first volume hologram (e.g. viewed in the viewing direction from the exit pupil onto the holographic projection device or onto the volume hologram).

The holographic projection device may further comprise the used light source. The used light source may be designed as an image module that generates the image to be projected. The image module may comprise an image generator for generating the image to be projected and optionally an imaging optical unit arranged downstream of the image generator (for example lenses, mirrors, etc.). In particular, the imaging optical unit may be provided between the image generator and the transparent body. The first volume hologram, which deflects the image to be projected for the projection, may be designed in particular as a transmissive volume hologram. However, it is also possible that it is designed as a reflective volume hologram.

Furthermore, the image to be generated can be exposed into the first volume hologram and the used light source can be designed such that its light causes the reconstruction of the image to be generated.

Furthermore, the first volume hologram may comprise a plurality of partial gratings, with each of which being designed for a predetermined wavelength with a specific bandwidth (of, for example, +10 nm). This may be wavelengths for red, green and blue light, for example. This allows a multi-colored image to be deflected. The image generation is preferably adapted to this, and corresponding color partial images are generated. These can be generated simultaneously or in sequence so quickly that a user can perceive them as a multi-colored image only when overlaid.

The holographic projection device may also be designed as a head-mounted device. For this purpose, a holding device may be provided, which is designed, for example, like glasses or a helmet.

It goes without saying that the features mentioned above and the features yet to be explained hereinafter can be used not only in the specified combinations but also in other combinations or on their own without departing from the scope of the present invention.

The invention will be explained in even greater detail below on the basis of exemplary embodiments with reference to the accompanying drawings, which likewise disclose features essential to the invention. These exemplary embodiments are provided for illustration only and should not be construed as limiting. For example, a description of an exemplary embodiment having a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments can be combined with one another, unless indicated otherwise.

Modifications and variations that are described for one of the exemplary embodiments can also be applicable to other exemplary embodiments. In order to avoid repetition, elements that are the same or correspond to one another in different figures are denoted by the same reference signs and are not explained repeatedly.

DETAILED DESCRIPTION

Figure 1:
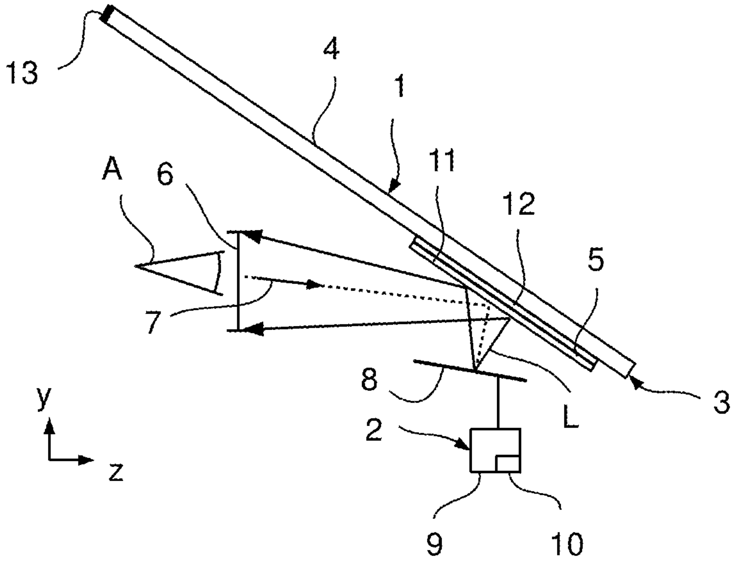
FIG. 1 shows a schematic view of a first embodiment of the holographic projection device.

In the embodiment shown in FIG. 1, the holographic projection device 1 comprises as used light source an image module 2 for generating an image (preferably a multi-colored image) and a projection unit 3, which in this case comprises a holographic beam splitter 5, integrated into a windshield 4 of a vehicle, on which the multi-colored image (the beam path of a light beam 2 is drawn as a representative) is deflected in the direction of an exit pupil 6 of the projection unit 3 such that a user who positions their eye A in the exit pupil 6 can perceive the multi-colored image as a virtual image, when they look along a predetermined viewing direction 7 at the projection unit 3 (or in this case at the holographic beam splitter 5).

The image module 2 may comprise an image generator 8 and a control unit 9 having a processor 10, wherein the control unit 9 controls the image generator 8 for generating the multi-colored image. The image generator 8 can be an LCD module, an OLED module, an LCoS module, or a tilt mirror matrix. Furthermore, the image generator may comprise a diffusing plate, which is not drawn here.

The multi-colored image is generated by means of the image generator 8 in that, for example, three color partial images with different wavelengths are generated. For example, they can be a blue color partial image with a wavelength of 460 nm, a green color partial image with a wavelength of 500 nm, and a red color partial image with a wavelength of 640 nm. The color partial images can be generated simultaneously or alternately in temporal succession so quickly that only the overlay is perceptible as a multi-colored image by a user.

The holographic beam splitter 5 comprises a photopolymer layer 11 in which a volume holographic grating is written for each of the three wavelengths. The three gratings thus overlay one another in the same volume (specifically in the photopolymer layer 11), such that a so-called multiplexing (or first volume hologram) is present. Each of the three volume holographic gratings is designed such that it is reflective for one of the three wavelengths mentioned (for example, with a bandwidth of +10 nm) and transmits the remaining wavelengths. The reflectivity of the individual volume holographic gratings is adjusted, for example, such that there is a reflectivity of approx. 45%. This is mainly due to the fact that, for the purpose described, reflectivities of 100% are not permitted in the windshield 4 of the vehicle for safety reasons, since the driver must also be able to see through the windshield 4 in the region of the holographic beam splitter 5. For other applications where such safety aspects are not important, the volume holographic gratings can certainly be designed to have a reflectivity of more than 45%.

Figure 2:
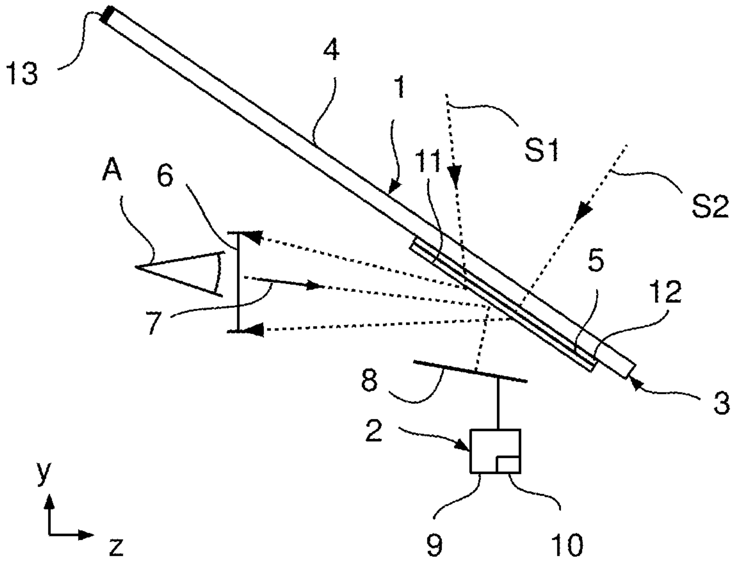
FIG. 2 shows a further schematic view of the holographic projection device for explaining the possibly occurring interfering light.
Figure 3:
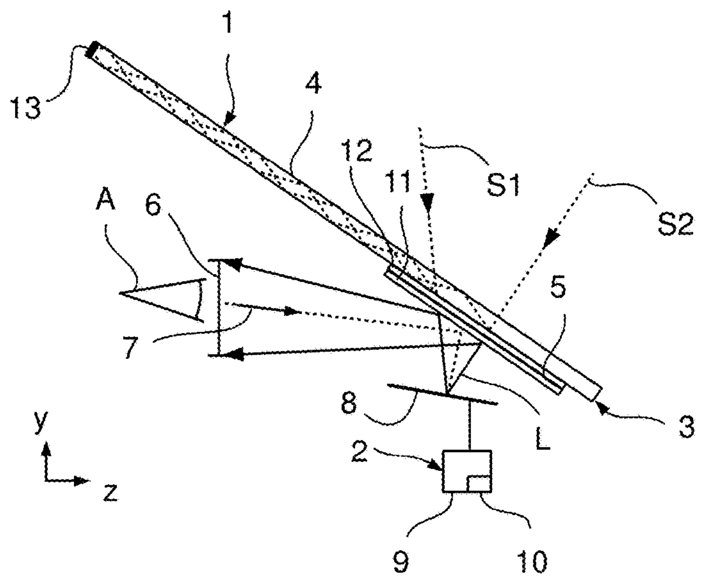
FIG. 3 shows a further schematic view of the holographic projection device for explaining the mode of action of the holographic filter 12.

A holographic filter 12, whose function is described in connection with FIGS. 2 and 3 is arranged between the photopolymer layer 11 and the windshield 4.

If the holographic filter were not present, light, for example, having a wavelength of 640 nm, which is incident onto the windshield 4 at a predetermined angle (e.g. −5° or −67°) from the front, is transmitted thereby and is incident on the photopolymer layer 11, would be deflected in an undesirable manner as interfering light to the exit pupil 6, as shown in FIG. 3. The corresponding angle-of-incidence ranges are indicated in FIG. 2 by the radiation S1 and S2. In order to prevent interfering light from falling into the exit pupil 6 (which can also be referred to as eyebox 6) in this manner, the holographic filter 12 is provided, which deflects (reflects here) radiation S1, S2 having a wavelength of 640 nm, which is incident at this angle, in a manner such that the radiation S1, S2 is not incident on the photopolymer layer 11, but is guided in the windshield 4, for example by total internal reflection, to a beam trap 13 arranged for example at the upper periphery and is absorbed there, as shown in FIG. 3.

Figure 4:
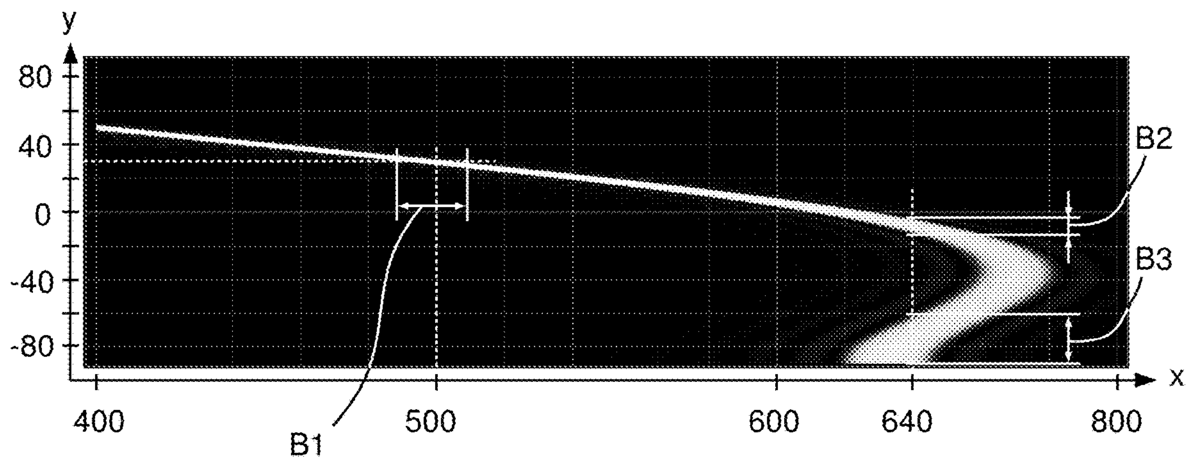
FIG. 4 shows a schematic illustration of the deflection efficiency of the grating for light with 500 nm in the polymer layer 11 as a function of the angle of incidence.

This described undesirable property of the gratings in the photopolymer layer 11 is explained in conjunction with FIG. 4 for the grating for the wavelength 500 nm.

In FIG. 4, the wavelength is plotted in nm along the x-axis and the angle of incidence is plotted in ° along the y-axis, wherein the higher the deflection efficiency is, the brighter the representation is.

As can thus be seen from the representation, the deflection efficiency lies in the range of 30° for the wavelength of 500 nm (range B1).

In addition, however, the grating has for a wavelength in the range of 640 nm in an undesirable and unavoidable manner a high deflection efficiency for the angles of incidence of −5° (range B2) and −67° (range B3).

Therefore, the holographic filter 12 is designed such that it causes a deflection for this wavelength and these angles of incidence in such a way that the interfering light no longer reaches the exit pupil. Preferably, the filter causes a deflection for this wavelength 640 nm and this angle of incidence of −5° and −67° in such a way that this radiation is deflected such that it is guided in the window 4 to the beam trap 13. In this way, the undesired interfering light can be safely avoided.

The occurrence of the interfering light and the prevention of the interfering light will be described further below in conjunction with FIGS. 5 to 8.

Figure 5:
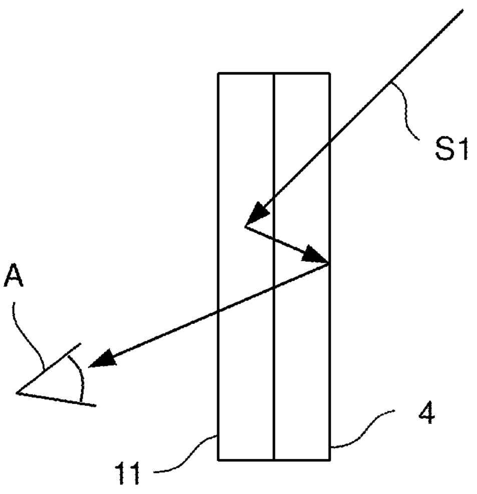
FIG. 5 shows a schematic illustration for explaining occurring interfering light.

The schematic sectional view in FIG. 5 shows that the radiation S1 would pass through the windshield 4 and impinge on the photopolymer layer 11, at which a reflection to the front of the windshield 4 would take place, at which in turn a reflection to the eye A of the viewer would take place.

Figure 6:
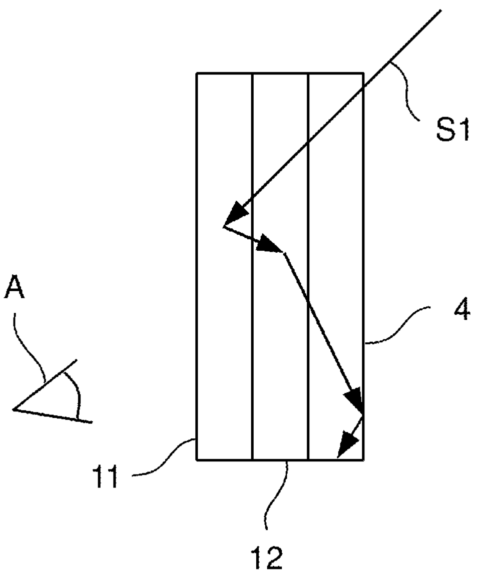
FIG. 6 shows a schematic illustration for explaining the mode of action of the holographic filter 12 for avoiding the interfering light according to FIG. 5.

In order to prevent this, as shown in FIG. 6, the holographic filter 12 is provided, which deflects the light reflected by the photopolymer layer 11 (radiation S1) in such a way that the deflected light is then guided in the windshield 4 by total internal reflection to the periphery of the windshield and there e.g. to the beam trap 13 (FIG. 3). Thus, the interfering light no longer enters the eye A of the viewer.

Figure 7:
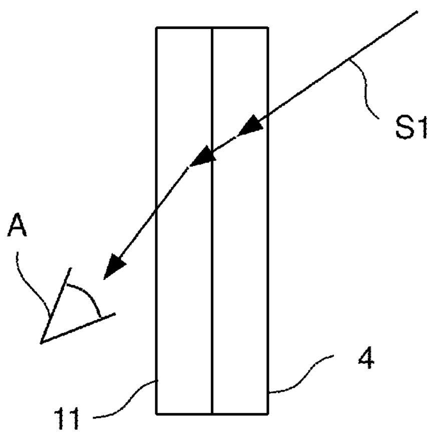
FIG. 7 shows a schematic illustration for explaining the possible occurrence of interfering light.

FIG. 7 shows the case in which the light S1 passes through the windshield 4 and is deflected at the photopolymer layer in such a way that it would impinge on the eye A of the viewer.

Figure 8:
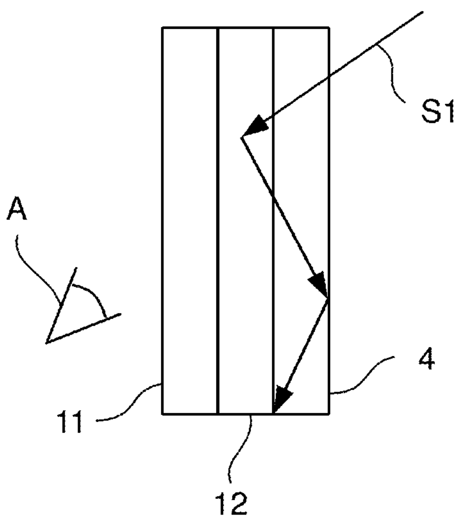
FIG. 8 shows an illustration for explaining the operation of the filter 12 for avoiding stray light according to FIG. 7.

FIG. 8 shows that, due to the holographic filter 12, the radiation S1 is deflected to the windshield 4 before it is incident on the photopolymer layer 11. The deflection to the windshield 4 is effected here in such a way that the radiation is guided in the windshield 4. This may preferably take place up to the beam trap 13 (FIG. 3).

In this way, the unwanted interfering light can thus be effectively prevented from entering the exit pupil 6. The radiation S1, S2 may be ambient light (for example, sunlight) or light from a light source other than light from the image generator 8.

In the embodiment described in connection with FIGS. 1 to 3, the unwanted light S1, S2 is deflected in the same manner as the light L of the image generator 8 in the y-z plane. In the case of a windshield of a car, this is the plane perpendicular to the road.

However, the holographic filter 12 may also be designed such that the unwanted light S1, S2 or the unwanted radiation S1, S2 are deflected in a plane parallel to the road and thus a plane which is perpendicular to the y-axis and parallel to the z-axis. In this way, the diffraction of the light L of the image generator 8 generated by the photopolymer layer 11 is in a different plane than the diffraction of the holographic filter 12 (in particular, the two planes here are perpendicular to each other), so that the diffractions are decoupled.

In the embodiment described in connection with FIGS. 1 to 3, the holographic filter 12 is located behind the polymer layer 11 with reference to the viewing direction 7. However, it is also possible to reverse the order of the holographic filter 12 and the photopolymer layer 11. In this case, the unwanted light S1, S2, which is diffracted at the photopolymer layer 11, is deflected by the holographic filter 13 such that it does not reach the exit pupil 6. The unwanted light S1, S2 is thus diffracted in a direction that is not critical.

For example, if the unwanted light S1, S2 is unpolarized (as is the case with sunlight), the diffraction efficiency of the holographic filter 12 can be optimized for the polarization which comprises a higher proportion after it enters the windshield 4. In the schematically enlarged side view according to FIG. 9, a sunlight ray 14 is shown, which comprises p-polarization components 15 and s-polarization components 16. When entering the windshield 4, a proportion of the beam 14 is reflected as beam 17 and a remaining proportion 18 enters the windshield 4. This effect is polarization-dependent and results in the reflected beam 17 comprising a greater s-polarization component than the coupled beam 18. This is indicated by the two points 16 for the beam 17 and by the single point 16 for the beam 18. Accordingly, the reflected beam 17 has a lower p-polarization component (only one double arrow 15) than the coupled beam 17 (two double arrows 15).

Figure 10:
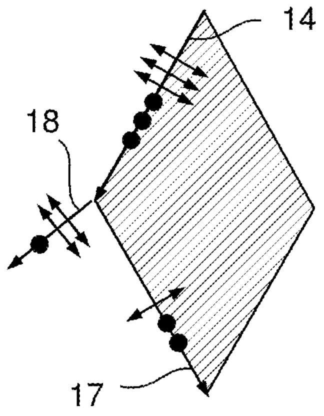
FIG. 10 shows a schematic illustration for explaining the reference plane for the polarization directions in FIG. 9.

The s-polarization is the polarization perpendicular to the reference plane spanned by the incident beam 14 and the reflected beam 17 (FIG. 10). Accordingly, the p-polarization is the polarization parallel to this reference plane.

Figure 9:
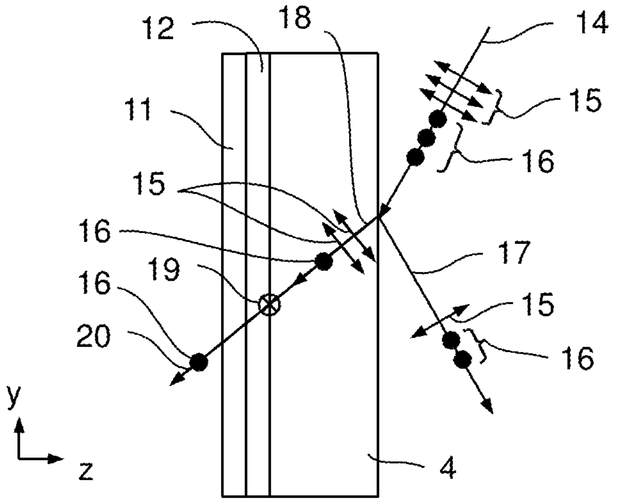
FIG. 9 shows a schematic enlarged side view of a further embodiment of the holographic projection device 1.
Figure 11:
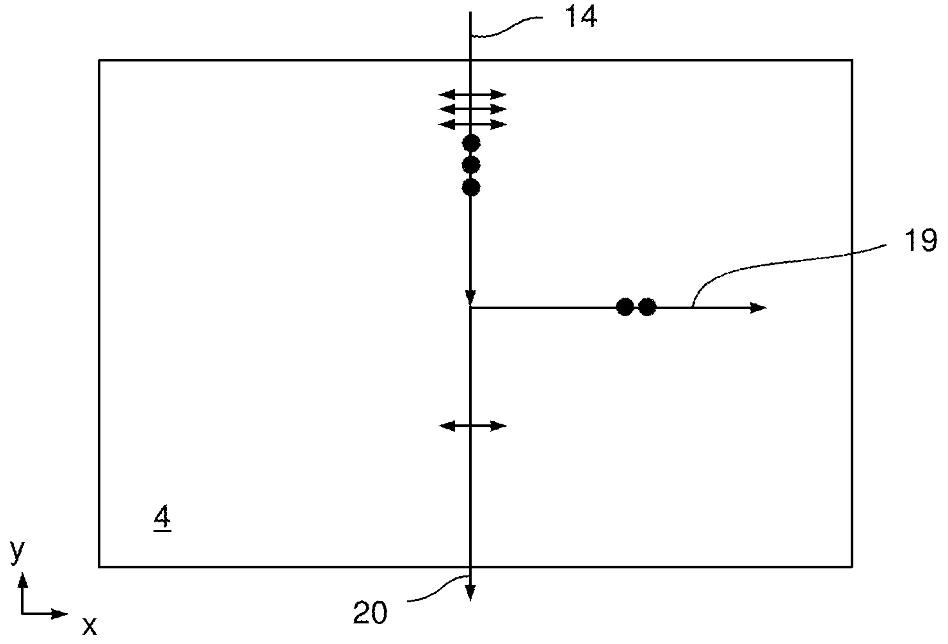
FIG. 11 shows a front view of the embodiment of FIG. 9.

The holographic filter 12 is now designed in such a way that it reflects the p-polarization component of the coupled beam 18, as indicated by the circle 19 with inscribed x in FIG. 9. However, the reflection is such that it takes place in the x-direction and thus into the drawing plane. This is clearer in the front view according to FIG. 11, in which the reflected beam 19 runs along the x-direction.

Figure 12:
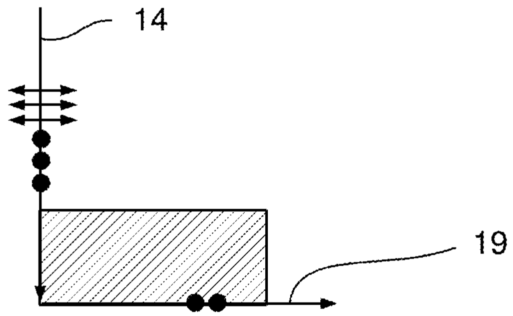
FIG. 12 shows an illustration for explaining the reference plane of the polarization directions for the diffraction that has taken place at the holographic filter 12.

The proportion of the beam 18 which is s-polarized is transmitted to a high extent by the holographic filter 12 (beam 20). However, this proportion is significantly lower than the p-polarization component, so that the unwanted interfering light 20 is almost completely suppressed. FIG. 12 shows the reference plane for the polarization for the diffraction at the holographic filter 12. This plane is spanned by the incident beam 18 and the diffracted beam 19.

Figure 13:
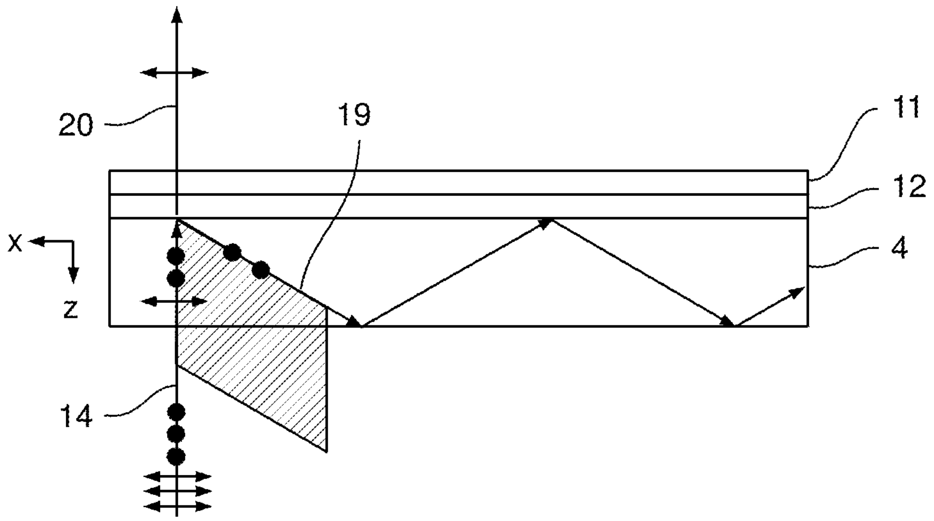
FIG. 13 shows a top view of the embodiment of FIG. 9.

In FIG. 13, the plan view is shown, from which it can be seen that the diffracted part 19 in the windshield 4 is guided by total internal reflection, as has already been described in connection with FIG. 3.

Figure 14:
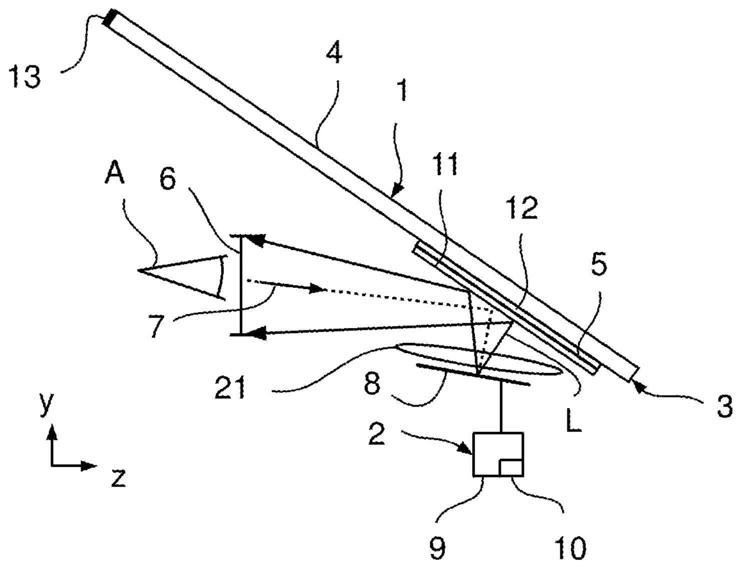
FIG. 14 shows a schematic view of a further embodiment of the holographic projection device.

Of course, it is possible that the projection device 1 according to the invention comprises further optical elements, for example for minimizing aberrations. Thus, mirrors and lenses can be used. As shown schematically in FIG. 14, for example, an optical unit 21 may be arranged between the image generator 8 and the holographic beam splitter 5, with the optical unit 21 being schematically drawn here as a lens.

Figure 15:
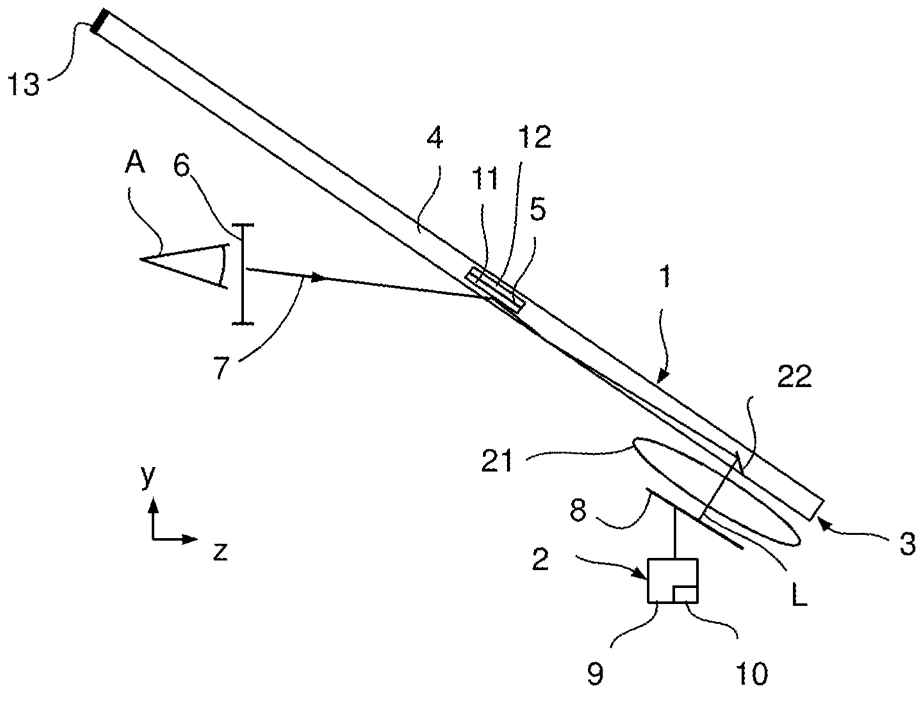
FIG. 15 shows a schematic view of a further embodiment of the holographic projection device.

Furthermore, a variation is shown in FIG. 15, in which the light from the image generator 8 is coupled into the windshield 4 via a coupling element 22 (for example deflection mirror) and is guided therein by way of at least one reflection to the photopolymer layer 11, on which the described output coupling is carried out.

Instead of the windshield 4, any other transparent body can also be used for the projection device 1 according to the invention. This transparent body can be designed as a plane-parallel plate. However, it is also possible that at least one boundary surface (for example, front and/or rear) is curved.

The photopolymer layer 11 and/or holographic filter 12 may be embedded in the transparent body, as shown with the windshield 4 in FIG. 15. However, it is also possible that the photopolymer layer 11 and/or the holographic filter 12 is formed on the front or rear of the transparent body, as shown, for example, in FIGS. 1-3, 13 and 14. In addition, a capping layer may be provided on the photopolymer layer 11 and/or the holographic filter 12.

Figure 16:
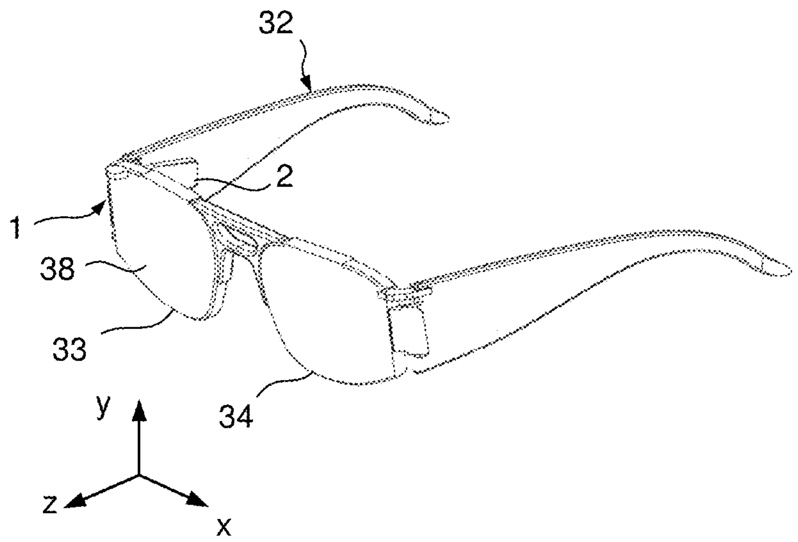
FIG. 16 shows a further embodiment of the holographic projection device.

The projection device 1 according to the invention can also be designed as being mountable on the user's head and for this purpose comprise a holding device 32, which can be mounted on the user's head and can be designed, for example, in the manner of a conventional spectacle frame (FIG. 16). In this case, the projection device 1 may comprise a first and a second spectacle lens 33, 34, which are attached to the holding device 32. The holding device 32 with the spectacle lenses 33, 34 may take the form for example of sports goggles or spectacles, sunglasses, and/or spectacles for correcting defective vision, it being possible for the virtual image to be superposed onto the user's field of view via the first spectacle lens 33.

The image module 2 may be arranged in the region of the right eyeglass temple of the holding device 32, as shown schematically in FIG. 16.

Figure 17:
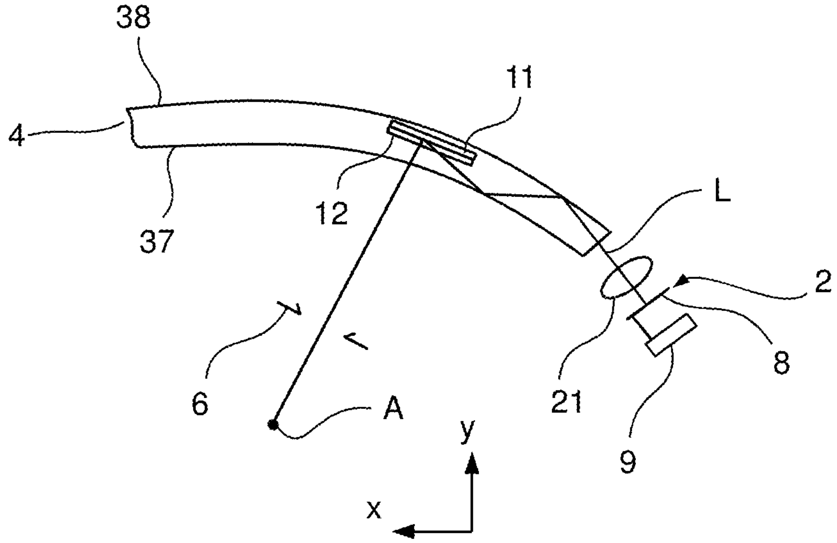
FIG. 17 shows a partial sectional view of the projection surface 1 of FIG. 16.

As can be best seen from the enlarged, schematic partial sectional view in FIG. 17, the first spectacle lens 33 comprises a rear 37 and a front 38. The rear 37 and the front 38 are curved here. However, it is also possible that they are planar. The curvature can be a spherical curvature or an aspherical curvature.

If the virtual image is to be visible in overlay with the environment, then again there may be an effective deflection efficiency in the range of, for example, 50%. If the environment should not be visible, the deflection efficiency selected can be greater.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A holographic projection device for generating an image that a viewer can perceive when their eye is positioned in a predetermined viewing region and they look at the projection device at a predetermined viewing angle, the holographic projection device comprising:

- a first volume hologram which, when exposed to light from a used light source, deflects the light to generate the image,
- wherein the first volume hologram is configured such that light that does not originate from the used light source and is incident on the first volume hologram is deflected at a predetermined solid angle such that the light is perceptible as unwanted interfering light; and
- a holographic filter that is configured to:
  - deflect the light that does not originate from the used light source and that is incident on the first volume hologram at the predetermined solid angle after the deflection via the first volume hologram such that the light is not perceptible as unwanted interfering light.

2. The holographic projection device of claim 1, wherein the first volume hologram is arranged on or in a transparent body, and wherein the holographic filter is arranged on or in the transparent body.

3. The holographic projection device of claim 2, wherein the holographic filter is configured to deflect the light that does not originate from the used light source and is, or would be, incident on the first volume hologram at the predetermined solid angle such that the light is guided in the transparent body as deflected light via at least one reflection.

4. The holographic projection device of claim 3, wherein the deflected light in the transparent body is guided via the at least one reflection to a beam trap.

5. The holographic projection device of claim 2, wherein the transparent body comprises a coupling point via which the light from the used light source is suppliable and after which a guidance in the transparent body to the first volume hologram, which is spaced apart from the coupling point, takes place.

6. The holographic projection device of claim 2, wherein the transparent body is a window of a vehicle or a windshield of a vehicle.

7. The holographic projection device of claim 6, wherein the window or windshield comprises an inner side facing the interior of the vehicle, and wherein the first volume hologram and the holographic filter are formed on the inner side.

8. The holographic projection device of claim 7, wherein the window or windshield comprises an outer side facing away from the inner side, and wherein the holographic filter is configured for light that does not originate from the used light source and enters the window or the windshield via the outer side.

9. The holographic projection device of claim 1, wherein the first volume hologram and the holographic filter are arranged one above the other.

10. The holographic projection device of claim 1, wherein the first volume hologram causes for at least one first wavelength range, the deflection for generating the image and the light that does not originate from the used light source and is, or would be, incident on the first volume hologram at the predetermined solid angle originates from a second wavelength range, which differs from the at least one first wavelength range.

11. The holographic projection device of claim 1, wherein the holographic filter comprises a second volume hologram.

12. The holographic projection device of claim 1, wherein the holographic filter is configured to reflect the light that does not originate from the used light source and would be incident on the first volume hologram at the predetermined solid angle.

13. The holographic projection device of claim 1, wherein the holographic filter deflects the light that does not originate from the used light source and is, or would be, incident on the first volume hologram at the predetermined solid angle, the polarization component of which is greater.

14. The holographic projection device of claim 13, wherein the greater polarization component is determined by coupling the light that does not originate from the used light source and is, or would be, incident on the first volume hologram at the predetermined solid angle into the transparent body.

15. The holographic projection device of claim 1, wherein the deflection via the first volume hologram is effected in a first plane, and the deflection via the holographic filter is effected in a second plane, which is neither parallel to nor coincides with the first plane.

16. The holographic projection device of claim 15, wherein the second plane is perpendicular to the first plane.

17. The holographic projection device of claim 1, further comprising the used light source.

18. The holographic projection device of claim 17, wherein the used light source comprises an image module, which generates an image to be projected which is deflected via the volume hologram to generate the image.

19. The holographic projection device of claim 18, wherein the image module comprises an image generator to generate the image to be projected, and wherein an imaging optical unit is arranged downstream of the image generator.

20. The holographic projection device of claim 1, wherein the image to be generated is exposed into the first volume hologram, and wherein the used light source is configured such that its light causes a reconstruction of the image to be generated.

* * * * *